(12) United States Patent
Osawa

(10) Patent No.: US 7,870,520 B2
(45) Date of Patent: Jan. 11, 2011

(54) SEMICONDUCTOR DEVICE AND YIELD CALCULATION METHOD

(75) Inventor: Morimi Osawa, Kawaski (JP)

(73) Assignee: Fujitsu Semiconductor Limited, Yokohama (JP)

( * ) Notice: Subject to any disclaimer, the term of this patent is extended or adjusted under 35 U.S.C. 154(b) by 425 days.

(21) Appl. No.: 11/972,709

(22) Filed: Jan. 11, 2008

(65) Prior Publication Data

US 2008/0172644 A1 Jul. 17, 2008

(30) Foreign Application Priority Data

Jan. 11, 2007 (JP) .............................. 2007-003524

(51) Int. Cl.
*G06F 17/50* (2006.01)
(52) U.S. Cl. .................... 716/4; 716/5; 716/19
(58) Field of Classification Search ............. 716/4, 716/5, 19, 8
See application file for complete search history.

(56) References Cited

U.S. PATENT DOCUMENTS

| | | | | |
|---|---|---|---|---|
| 6,324,481 | B1 * | 11/2001 | Atchison et al. | 702/84 |
| 6,393,602 | B1 * | 5/2002 | Atchison et al. | 716/4 |
| 6,717,431 | B2 * | 4/2004 | Rathei et al. | 324/765 |
| 6,751,519 | B1 * | 6/2004 | Satya et al. | 700/121 |
| 6,834,375 | B1 * | 12/2004 | Stine et al. | 716/2 |
| 2003/0097228 | A1 * | 5/2003 | Satya et al. | 702/82 |
| 2008/0072207 | A1 * | 3/2008 | Verma et al. | 716/21 |
| 2008/0140330 | A1 * | 6/2008 | Morioka et al. | 702/81 |

OTHER PUBLICATIONS

C. H. Stapper; "Modeling of Integrated Circuit Defect Sensitivities". IBM J. Res. Develop., vol. 27, No. 6 Nov. 1983, pp. 549-557.
C. H. Stapper; "Modeling of defects in integrated circuit photolithographic patterns"; IBM R4es. Develop., vol. 28, No. 4, Jul. 1984, pp. 461-475.
Jitendra Khare et al. Accurate Estimation of Defect-Related Yield Loss in Reconfigurable VLSI Circuits; IEEE Journal of Solid-State Circuits. vol. 28, No. 2, Feb. 1993, pp. 146-156.

* cited by examiner

*Primary Examiner*—Sun J Lin
(74) *Attorney, Agent, or Firm*—Westerman, Hattori, Daniels & Adrian, LLP

(57) ABSTRACT

A semiconductor device yield calculation method and a computer program that include selecting from a designed device pattern a specified first pattern and a second pattern that differs from the first pattern, finding a probability that the second pattern passes a test when the first pattern passes the test for each of a plurality of distances between the first pattern and the second pattern, and finding a yield of the device pattern based on a product of the probability and a yield value for the first pattern.

18 Claims, 14 Drawing Sheets

| FOCUS MARGIN (nm) | 0.1 | 0.2 | 0.3 | 0.4 | 0.5 |
|---|---|---|---|---|---|
| SYSTEMATIC YIELD (%) | 80 | 97 | 99 | 99.9998 | 99.9999 |

|  | DISTANCE ($\mu$m) | | | | | |
|---|---|---|---|---|---|---|
|  | 0 | 10 | 20 | 50 | 100 | 300 |
| PROBABILITY THAT TWO $L_1$ SIMULTANEOUSLY PASS TEST | 1.00 | 0.96 | 0.94 | 0.91 | 0.90 | 0.90 |
| PROBABILITY THAT TWO $L_2$ SIMULTANEOUSLY PASS TEST | 1.00 | 0.98 | 0.97 | 0.96 | 0.95 | 0.95 |
| PROBABILITY THAT $L_2$ PASSES TEST WHEN $L_1$ PASSES TEST | 1.00 | 1.00 | 0.99 | 0.96 | 0.95 | 0.95 |

| DEPRESSION DEPTH (nm) | 0 | 30 | 40 | 50 |
|---|---|---|---|---|
| SYSTEMATIC YIELD (%) | 99.99999 | 99.9 | 99 | 90 |

SEMICONDUCTOR DEVICE AND YIELD CALCULATION METHOD

CROSS REFERENCE TO RELATED APPLICATIONS

This application is based upon and claims the benefit of priority from the prior Japanese Patent Application No. 2007-3524, filed on Jan. 11, 2007, the entire contents of which are incorporated herein by reference.

TECHNICAL FIELD

The present invention relates to a yield calculating method for a semiconductor device obtained in which a yield for the semiconductor device is calculated with high accuracy, and to a computer program for executing the yield calculating method for the semiconductor device.

BACKGROUND

It is well-known that the main reasons for reduction in a yield ratio of LSI are short or open circuit faults caused by foreign dust and particles becoming attached to a substrate. In the simplest model for calculating yield, it is assumed that as the chip size increases, the number of particles increases and the yield falls accordingly. According to this way of thinking, the yield may be expressed using a model such as the following: Expression (1) is a Poisson model.

$$Y = \exp(-AD) \quad (1)$$

Here, Y is the yield, A is chip area and D is defect density.

Based on this way of thinking, a smaller chip size results in a higher yield. Thus semiconductor chips with small size not only allow a large number of chips to be obtained from a single semiconductor wafer, but also give a high yield. Therefore, based on this way of thinking, it is desirable to design chips with the smallest possible chip size.

However, higher levels of integration and performance have brought more complex semiconductor device circuits, and sometimes it is no longer possible to achieve the same yields at a given chip size for these circuits. For instance, the defect probability resulting from a wire forming process is different in semiconductor devices with a wide interval between wires and semiconductor devices with a narrow interval between wires. Hence, for a given chip size, the yield for semiconductor devices with the wide interval between wires differs from the yield semiconductor devices with the narrow interval between wires.

To deal with such phenomena, methods have been proposed for considering yield on the basis of critical areas. (See for example C. H. Stapper. "Modeling of Integrated Circuit Defect Sensitivities", IBM J. RES. DEVELOP., Vol. 27, No. 6, November 1983, p. 549-557, C. H. Stapper, "Modeling of defects in integrated circuit photolithographic patterns", IBM J. RES. DEVELOP., Vol. 28, No. 4, July 1984 p. 461-475, and Jitendra Khare et al., "Accurate Estimation of Defect-Related Yield Loss in Reconfigurable VLSI Circuits", IEEE Journal of Solid-State Circuits, Vol. 28, No 2, February 1993, p. 146-156.) By the critical area way of thinking, faults are likely to occur due to foreign bodies becoming attached at points where wiring width and wiring intervals are narrow. Therefore, to improve yield, wiring widths and wiring intervals should be designed to be wide if the space is available.

In recent years, size reductions in semiconductor devices have continued, deterioration in yield resulting from factors other than foreign bodies becoming attached to the substrate have become more noticeable. For instance, there has been a marked increase in phenomena such as frequent short circuit faults in a layouts with particular patterns. Recently, process margins have been reduced by the shrinking size of the semiconductor devices, and 65 nm generation process margins are nearing the control limits of the manufacturing apparatus. Thus, in patterns where the process margins are small and various undesirable conditions are present, wiring breakdowns and short circuits occur. Yield, which is reduced as a result of these type of phenomena, is known as systematic yield Ys, and strongly depends on layout patterns. The systematic yield Ys is separate from random yield Yr which is reduced as result of the foreign bodies becoming attached to the substrate.

Methods for predicting product chip yield while taking into account both the random yield Yr and systematic yield Ys are well-known. (See for instance U.S. Pat. No. 6,834,375, Brian E. Stine, et al.). In U.S. Pat. No. 6,834,375, product chip yield predictions are expressed as a product of random yield and systematic yield, as described below.

[Formula 1]

$$Y = \left(\prod_{i=1}^{n} Ys_i\right)\left(\prod_{j=1}^{m} Yr_j\right) \quad (2)$$

Note that "region-based yield models", and "example-based yield models" are disclosed as models for systematic yield factor Ysi. In "example-based yield models" for the systematic yield factor Ysi for a new layout is found as described below. The yield for a specific layout is quantified in advance using a test chip, and the systematic yield factor Ysi for the new layout is found based on the yield determined using the test chip. The systematic yield factor Ysi is expressed using the following expression.

[Formula 2]

$$Ys_i = \left(\frac{Y_0(q)}{Y_r(q)}\right)^{\frac{N(q)}{N_0(q)}} \quad (3)$$

Here, q represents design factors, such as line width, line interval, length, width/interval ratio, and density, found by testing the test chip (characterization vehicle). Y0(q) is the yield for a structure having a design factor q in the test chip (characterization vehicle). Yr(q) is the yield predicted for a structure when the mechanism for yield failure is assumed to be random defects alone. N(q) is the number of times a pattern having the factor q appears in a product layout. N0(q) is the number of times the pattern having the factor q appears on the test chip.

The systematic yield for each pattern having the factor q determined using the test chip is expressed as follows.

[Formula 3]

$$\left(\frac{Y_0(q)}{Y_r(q)}\right)^{\frac{1}{N_0(q)}} \quad (4)$$

From the above, it is clear that the systematic yield factor Ysi of a product chip including N pattern each having factor q is the systematic yield for each pattern having the factor q quantified using the test chip to the N(q)-th power.

However, there are times when the systematic yield for the semiconductor device calculated using the proposed method differs from the actual systematic yield for the semiconductor device. This is because the proposed method fails to take into account various other factors such as whether the plurality of patterns with a the factor q are densely-packed or spread-out across the product chip. As a result the systematic yield for the semiconductor device calculated using the proposed method is calculated lower than the systematic yield for the actual semiconductor device.

Thus, in the prior art, there exists the problem that the systematic yield of the semiconductor device cannot be accurately calculated.

SUMMARY

The present invention is directed to various embodiments of a semiconductor device yield calculation method and a computer program that include selecting from a designed device pattern a specified first pattern and a second pattern that differs from the first pattern, finding a probability that the second pattern passes a test when the first pattern passes the test for each of a plurality of distances between the first pattern and the second pattern, and finding a yield of the device pattern based on a product of the probability and a yield value for the first pattern.

DETAILED DESCRIPTION OF THE EMBODIMENTS

Figure 5:
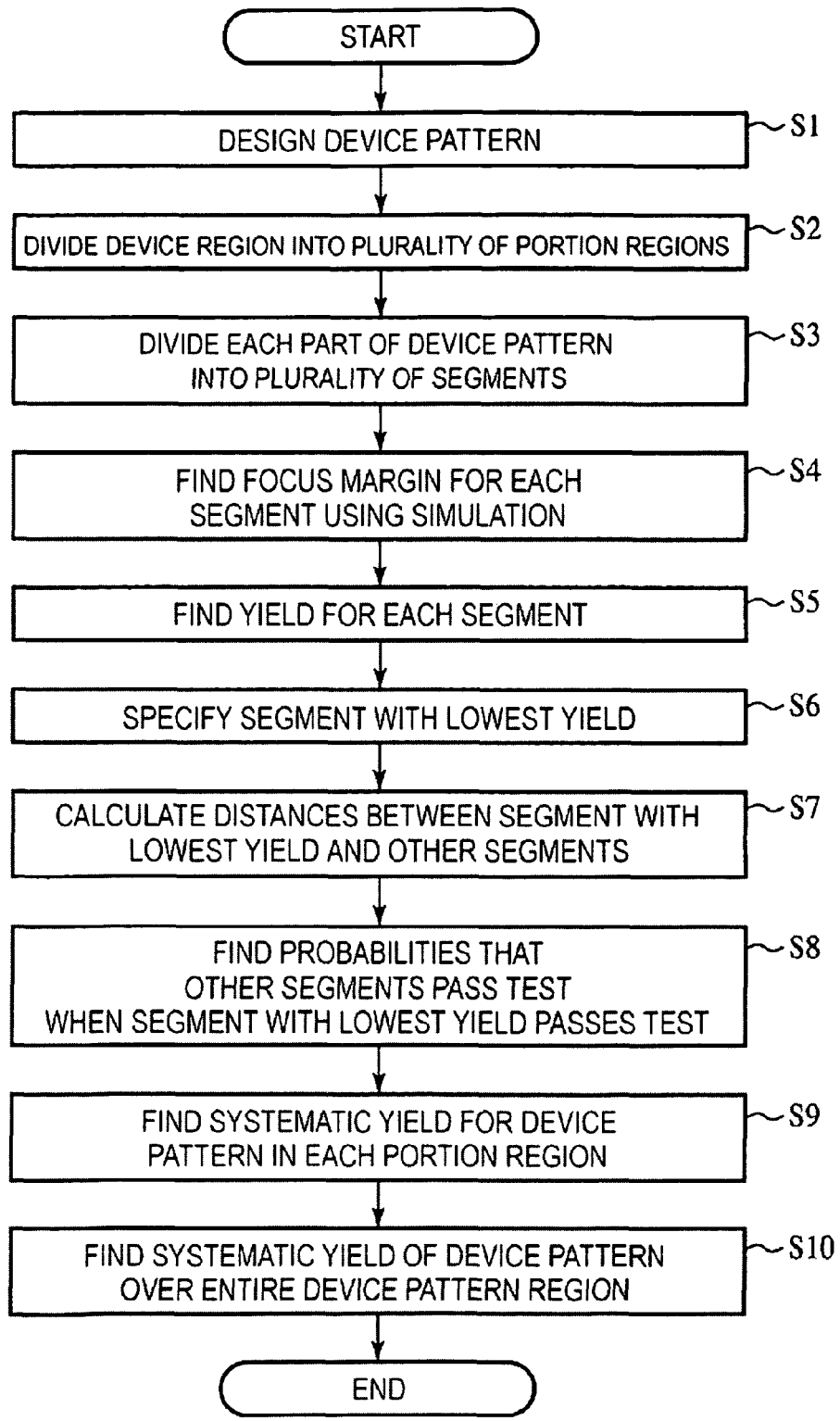
FIG. 5 is a flowchart showing a method for calculating systematic yields for designed device patterns.
Figure 6:
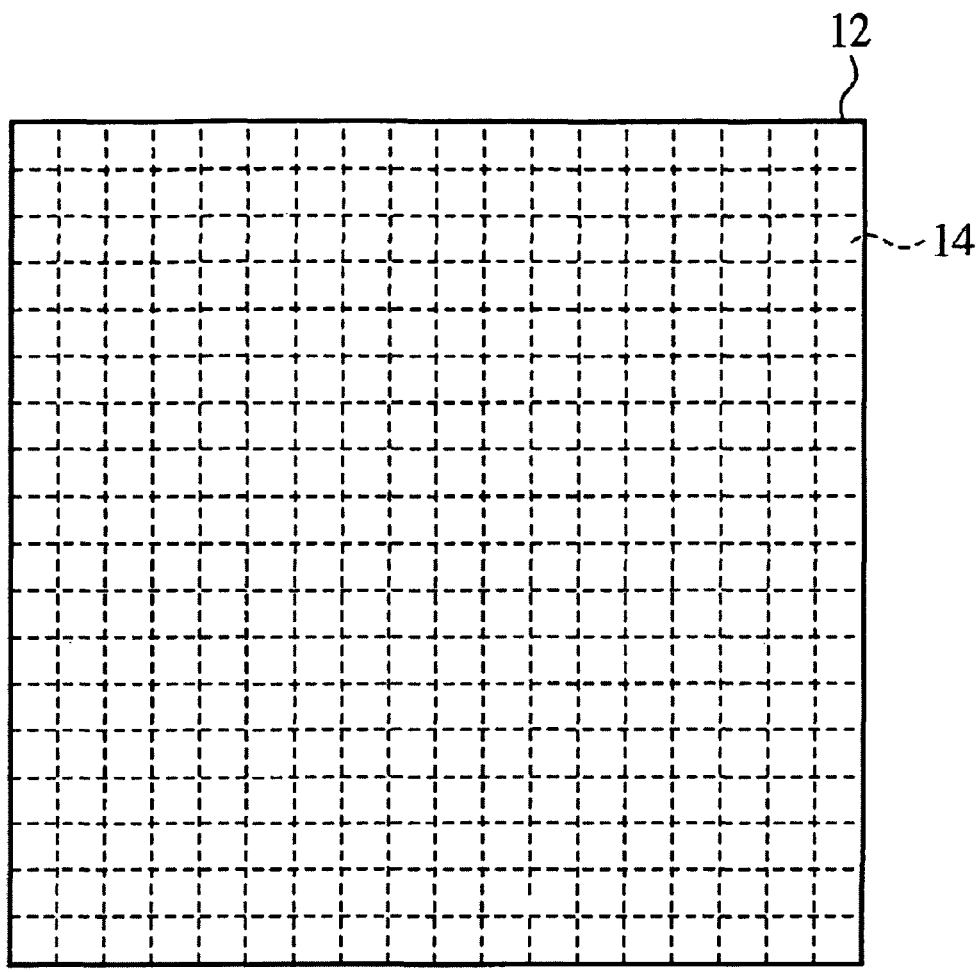
FIG. 6 is a plan view showing a device pattern that has been divided into a number of regions.

A yield calculating method for a semiconductor device and a computer program for executing the yield calculating method for the semiconductor device according to the first embodiment are described below with reference to FIGS. 1 to 9. FIG. 1 includes plan views showing an example in which N0 sample patterns L1 are arranged in an array on a semiconductor substrate. FIG. 2 includes plan views showing an example in which N0 sample patterns L2 are arranged in an array on a semiconductor substrate. FIG. 3 includes a graph and a table of values showing a relationship between focus margin and systematic yield. FIG. 4 includes a graph and a table of values showing a pass probability in a test of other sample patterns when a given sample pattern has passed the test; FIG. 5 is a flowchart showing a method for calculating systematic yields for designed device patterns. FIG. 6 is a plan view showing a device pattern that has been divided into a number of regions. FIG. 7 is a plan view showing a device pattern with each sided divided into segments. FIG. 8 includes plan views of a focus margin of segments calculated at various stages of a simulation; FIG. 9 is a graph showing a relationship between amount of separation of resist-pattern dimension from reference values and an amount of defocus.

The semiconductor device yield calculating method according to the present embodiment is executable using, for instance, a semiconductor design device (CAD) in which a program for executing the semiconductor device yield calculating method according to the present embodiment has been installed. The computer program can be provided on a storage medium such as a CD-ROM. Alternatively, the computer program may be pre-installed on the semiconductor design device. Pre-installing the computer program on the semiconductor design device makes it possible to provide a yield calculating device capable of executing the yield calculating method of the present embodiment.

As described above, in the proposed method, a yield for each layout on the semiconductor chip was found using a test chip or the like, and the systematic yield Ys was then found by calculating the product of the values of these yields.

However, as described above, there were times when the systematic yield for the semiconductor device calculated using the proposed method differed from the actual systematic yield for the semiconductor device. For instance, there were cases when systematic yield for the semiconductor device calculated using the proposed method was lower than the actual systematic yield for the actual semiconductor device.

For example, when the device pattern on the photoresist film formed on the semiconductor substrate is exposed to light, defocus sometimes occurs. This defocus is a factor in the deterioration of yield. Points at which there is marked defocus may, for instance, occur periodically at intervals of a few hundred microns.

Hence, when two patterns with comparatively small focus margins are positioned adjacent to each other and one of the two patterns passes a test, there is a strong possibility that the other pattern will also pass the test. Moreover, when one of the two patterns fails the test, there is a strong possibility that the other pattern will also fail the test. Hence, the pass probability for a second of the two patterns when the first of the two has passed the test is dependent on the distance between the two patterns. When a given pattern passes a test, the test pass probability for another pattern separated from the given pattern increases as the two patterns become closer. Thus, it is possible to define the test pass probability for the other pattern that is separated from the given pattern, which has passed the test, using a table or function with the distance between the two patterns as a parameter.

Note that when the distance between the given pattern and the other pattern is sufficiently large, whether one of the two patterns passes a test no longer has any effect on whether the other pattern passes the test.

In the proposed method, the systematic yield was calculated under the assumption that whether the given pattern passed the test was entirely irrelevant to whether the other pattern would pass. As described above, in the proposed method, the systematic yield factor Ysi of a product chip including N patterns having the factor q is expressed by the systematic yield for each pattern having the factor q determined using the test chip to the N(q)-th power. The systematic yield for each pattern having the factor q, where the factor q has been determined using the test chip, is expressed as follows.

[Formula 4]

$$\left(\frac{Y_0(q)}{Y_r(q)}\right)^{\frac{N(q)}{N_0(q)}} \quad (5)$$

As is clear from the above, in the proposed method, the systematic yield for a pattern having a given characteristic is simply the product of all the yield values for the patterns on the semiconductor chip, and the distances between patterns are not taken into account. This means there will be cases when the systematic yield for the semiconductor device calculated using the proposed method is excessively low in comparison to the actual systematic yield for the semiconductor device.

In the yield calculating method of the present embodiment, the systematic yield for the semiconductor device is calculated more accurately by using a method which takes into account the distance between various partial patterns which make up the device pattern of the semiconductor device.

In the yield calculating method of the semiconductor device according to the present invention, the first step is to determine the relationship between the systematic yield and the distance using a test chip. Here, the method of the present embodiment is described using as an example a case in which focus margin-dependent systematic yields Ys1 to Ysn are found for a device pattern in a targeted layer.

First, the various sample patterns (test patterns, test vehicles) L1 to Ln with differing focus margins are selected from the device pattern in the targeted layer. To be more specific, each sample pattern L1 to Ln in the target layer is laid out in matrix form (array form) with a quantity of NO sample patterns in each matrix. Then, circuits necessary for testing each of sample patterns L1 to Ln are designed at the periphery of the sample patterns L1 to Ln and in the layers above and below the target layer.

Figure 1A:
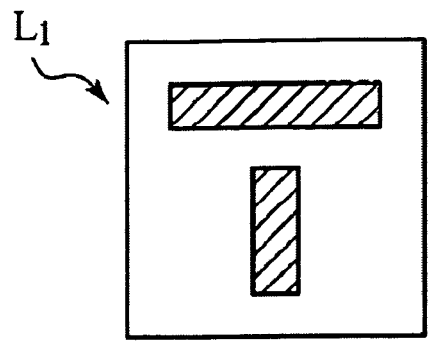
FIGS. 1A and 1B are plan views showing an example in which N0 sample patterns L1 are arranged in an array on the semiconductor substrate.
Figure 1B:
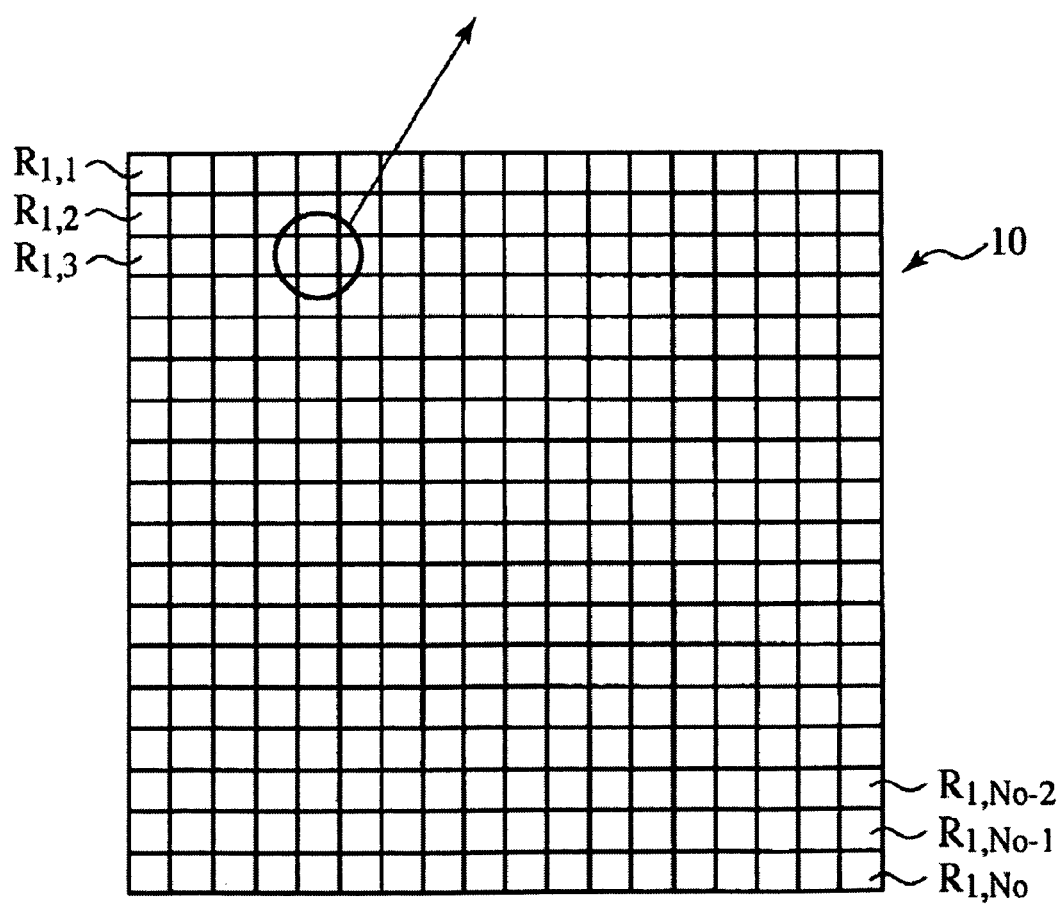

FIGS. 1A and 1B are plan views showing an example in which a quantity NO of the sample patterns L1 are arranged in an array in the target layer of the test chip. FIG. 1A is a plan view showing the sample pattern L1 and is an enlarged view of the encircled portion in FIG. 1B.

FIG. 1B is a plan view showing the manner in which the sample patterns L1 are laid out in the array. In FIG. 1B, the symbols R1, 1 to R1, NO each indicate a sample pattern. As shown in FIG. 1, NO sample patterns L1 are laid out in the array on the target layer 10 of the test chip. The sample patterns L1 laid out in the array form a sample pattern group.

Figure 2A:
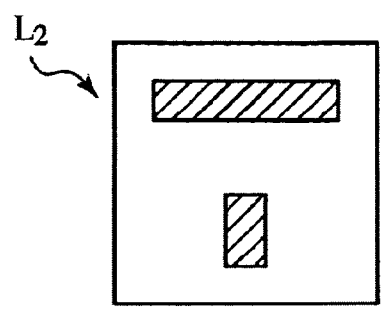
FIGS. 2A and 2B are plan views showing an example in which N0 sample patterns L2 are arranged in an array on the semiconductor substrate.
Figure 2B:
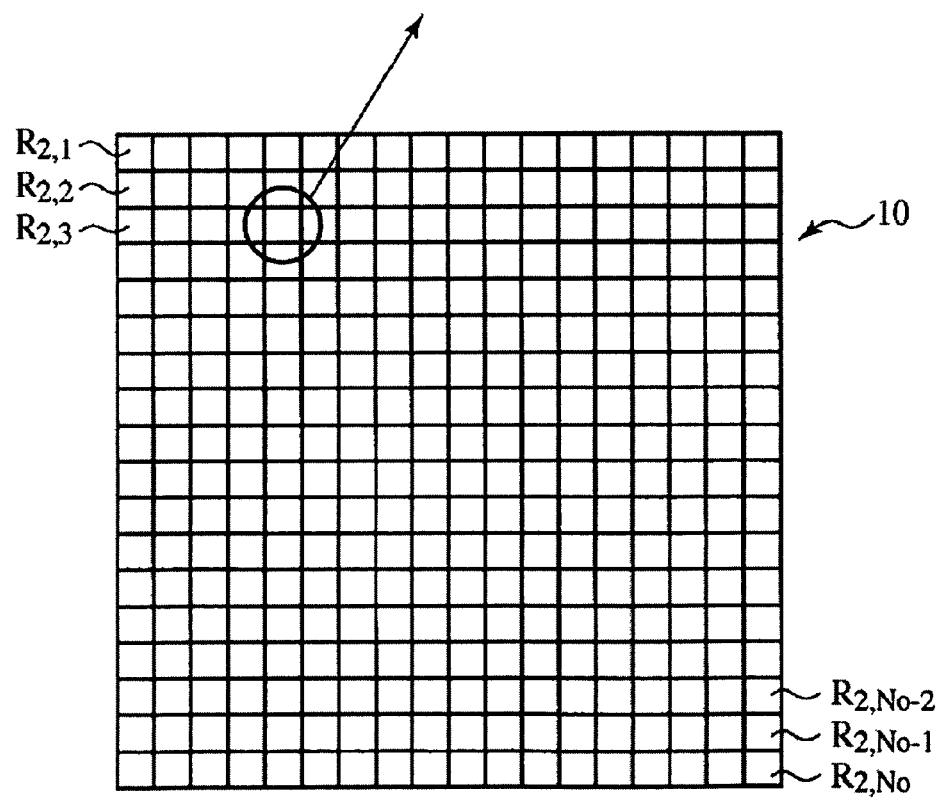

FIG. 2 includes plan views showing an example in which a quantity NO of the sample patterns L2 are arranged in an array on the target layer 10 of the test chip. FIG. 2A is a plan view showing the sample pattern L2 and is an enlarged view of the encircled portion in FIG. 2B. FIG. 2B is a plan view showing the manner in which the sample patterns L2 are laid out in the array. In FIG. 2B, the symbols R2, 1 to R2, NO each indicate a sample pattern. As shown in FIG. 2, NO sample patterns L2 are laid out in the array on the target layer 10 of the test chip. The sample patterns L2 laid out in the array form a sample pattern group.

In the same way, a quantity NO of the sample pattern Ln is arranged in an array on the target layer 10 of the test chip. Then, circuits necessary for testing each of sample patterns Ln are designed at the periphery of each sample pattern Ln and in the layers above and below the target layer.

Next, the designed test chip is manufactured on a production line.

A yield Y1 to Yn is then found for each of the sample patters L1 to Ln by finding the number of the sample patterns that pass the test among the NO patterns corresponding to each of the sample patterns L1 to Ln formed on each semiconductor substrate 10.

The yield Yn for the sample pattern Ln is expressed using the following equation.

$$Yn=Pn/NO \quad (6)$$

Here, Pn is the number of sample patterns Ln to pass the test and NO is the number of sample patterns Ln formed on the semiconductor substrate 10.

Next, the systematic yields Ys1 to Ysn resulting from defocus are found by dividing the yields Y1 to Yn for the sample patterns L1 to Ln by the corresponding yields Yr1 to Yrn which result from random components calculated in advance.

The systematic yield Ysn caused by the defocus is expressed using the following equation.

$$Ysn=Yn/Yrn \quad (7)$$

Here, Yn is the yield for the sample pattern Ln and Yrn is the yield for the sample pattern Ln resulting from random components.

Note that the yields Yr1 to Yrn resulting from random components are the yields which are reduced due to foreign bodies or the like becoming attached to the substrate or other random factors.

When the yield is greatly reduced by factors other than the random components or defocus, the yields resulting from these factors are calculated separately as Yr1' to Yrn' and the systematic yields Ys1 to Ysn due to defocus are found by further dividing the yields Y1 to Yn of the sample patterns L1 to Ln by Yr1' to Yrn'.

As described above, the focus margin differs for each of the sample patterns L1 to Ln. Hence, each of the systematic yields Ys1 to Ysn corresponding to the focus margins are found.

The relationship between focus margin and systematic yield is defined using a table of values or a function.

Figures 3A, 3B:
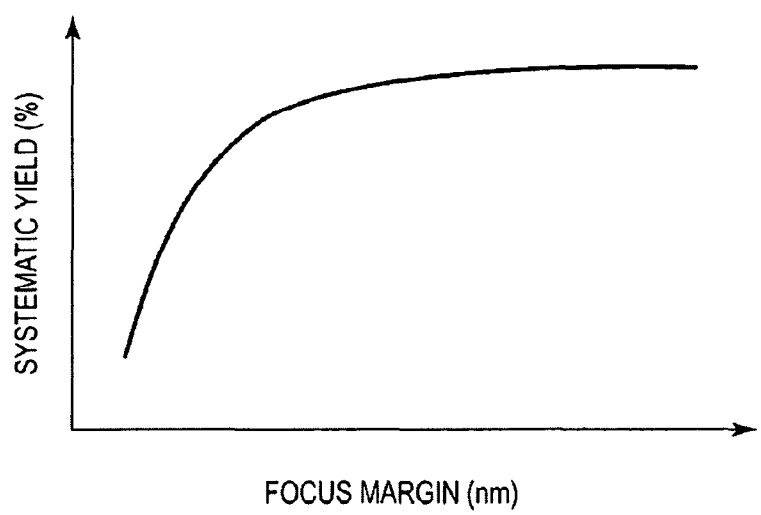
FIGS. 3A and 3B are a graph and a table of values showing a relationship between focus margin and systematic yield

FIG. 3A is a graph showing the relationship between focus margin and systematic yield. The horizontal axis in FIG. 3A shows focus margin and the vertical access shows systematic yield. FIG. 3B is a table of values showing the relationship between focus margin and systematic yield.

Next, the distance-dependence of pass probability for two patterns undergoing the test simultaneously is found using the following procedure.

The pass probability, when a given sample pattern L1 passes the test, for another sample patter L1 located a certain distance away from the given sample pattern L1 is found as follows.

For instance, when tests are performed on each sample pattern R1,1 to R1, NO in the sample pattern group arranged as shown in FIG. 1 with sample patterns failing the test denoted "0" and sample patterns passing the test denoted "1", the results are, for instance, $R1,1(x_{1,1}, y_{1,1})=0$, $R1,2(x_{1,2}, y_{1,2})=1, \ldots, R1, NO(x1, NO, y1, NO)=0$. Here, the contents of the brackets are the coordinates of the sample patterns R1,1 to R1,NO.

Next, sample patterns having a same separating distance d are extracted based on the coordinates of sample patterns R1,1 to R1,NO.

Next, a test pass probability P1-1 for a second sample pattern L1 when a first sample pattern L1 has passed the test is found based on a combination of the extracted sample patterns L1, using the following equation.

[Formula 5]

$$P_{1-1}(d) = \frac{\sum_{i=1}^{n} a_i b_i}{\sum_{i=1}^{n} a_i} \quad (8)$$

Here, ai, bi, and the distance d are expressed as follows.

$$a_i = R_{1,j}(x_{1,j}, y_{1,j}) \quad (9)$$

$$b_i = R_{1,k}(x_{1,k}, y_{1,k}) \quad (10)$$

[Formula 6]

$$d = \sqrt{(x_{1,j} - x_{1,k})^2 + (y_{1,j} - y_{1,k})^2} \quad (11)$$

In this way, the pass probability P1-1 for the second sample pattern L1 when the first sample pattern L1 has passed the test is found for each distance d between first and second sample patterns. In other words the pass probability P1-1 for simultaneously tested sample patterns L1 having the same focus margin is found for each distance d.

Note that when it is not possible to extract a sufficient number of combinations of given sample pattern L1 and other sample pattern L1 with exactly the same separating distance d, combinations of given sample pattern L1 and other sample pattern L1 with a separating distance that is within a given range may be extracted. For instance, combinations satisfying the following equation may be extracted.

[Formula 7]

$$d - \frac{1}{2}\Delta d \leq \sqrt{(x_{1,j} - x_{1,k})^2 + (y_{1,j} - y_{1,k})^2} < d + \frac{1}{2}\Delta d \quad (12)$$

Through use of the above-described analysis on sample patterns L1 to sample patterns Ln, it is possible to find the simultaneous test pass probability for each distance d separating two similarly-formed patterns. In other words, through use of the above-described analysis on sample patterns L1 to sample patterns Ln, it is possible to find the probability that two sample patterns with the same focus margin pass the test simultaneously as a function of distance d between two sample patterns.

Next, when a first sample pattern has passed a test, the test pass probability for a second sample pattern with a different form to a first sample pattern is found for each sample pattern separation distance In other words the pass probability for simultaneously tested sample patterns with differing focus margins is found for each sample pattern separating distance d.

First, a quantity N1 of the each of the sample patterns L1 to Ln are arranged randomly on a target layer of the test chip. Then, circuits necessary for testing each of sample patterns L1 to Ln are designed at the periphery of each of the sample patterns L1 to Ln and in the layers above and below the target layer.

Next, the designed test chip is manufactured on a production line.

Next, tests are performed on each of the sample patterns L1 to Ln using the manufactured test chip. When a given sample pattern passes the test, the pass probability for another sample pattern with a different form to the given sample pattern can be found based on the test results. For instance, when the sample pattern L1 has passed the test, the following equation can be used to find a pass probability P1-2 for a sample pattern L2 provided exactly a distance d away from the sample pattern L1.

[Formula 8]

$$P_{1-2}(d) = \frac{\sum_{i=1}^{n} a_i b_i}{\sum_{i=1}^{n} a_i} \quad (13)$$

Here, ai, bi, and the distance d are expressed as follows.

$$a_i = R1, j(x1, j, y1, j) \quad (14)$$

$$b_i = R2, k(x2, k, y2, k) \quad (15)$$

[Formula 9]

$$d = \sqrt{(x_{1,j} - x_{1,k})^2 + (y_{i,j} - y_{2,k})^2} \quad (16)$$

Note that when it is not possible to extract a sufficient number of combinations of given sample pattern L1 and other sample pattern L2 with exactly the same separating distance d, combinations of given sample pattern L1 and other sample pattern L2 with a separating distance that is within a given range may be used. For instance, combinations satisfying the following equation may be extracted.

[Formula 10]

$$d - \frac{1}{2}\Delta d \leq \sqrt{(x_{1,j} - x_{1,k})^2 + (y_{1,j} - y_{2,k})^2} < d + \frac{1}{2}\Delta d \quad (17)$$

It is then possible to find the probability that other combinations of various sample patterns pass a test simultaneously as a function of separating distance in the above-described manner.

The following enables calculation of a test pass probability for a second sample pattern provided exactly a distance d away from a first sample pattern which has passed the test without using sample pattern groups which include sample patterns provided randomly on the semiconductor substrate.

First, the systematic yields Ys1 to Ysn caused by defocus are calculated in the same way as described above for the corresponding sample patterns L1 to Ln. The systematic yields Ys1 to Ysn caused by the focus alignment are calculated in the above-describe manner using the sample pattern groups composed of sample patterns arranged in an array on the semiconductor substrate 10.

Next, the sample patterns with the lowest yield among the sample patterns L1 to Ln are specified. Here, an example in which the sample pattern with the lowest yield L1 is described.

Next, when a given sample pattern L1 passes the test, the test pass probability P1-1 of another sample pattern L1 provided a distance d away from the sample pattern L1 is found. Next, when a given sample pattern L1 pass the test, the test pass probability P1-1 of another sample pattern L1 provided a distance d away from the sample pattern L1 is calculated in the above-described manner using the sample pattern groups composed of sample patterns arranged in an array on the semiconductor substrate 10.

Figures 4A, 4B:
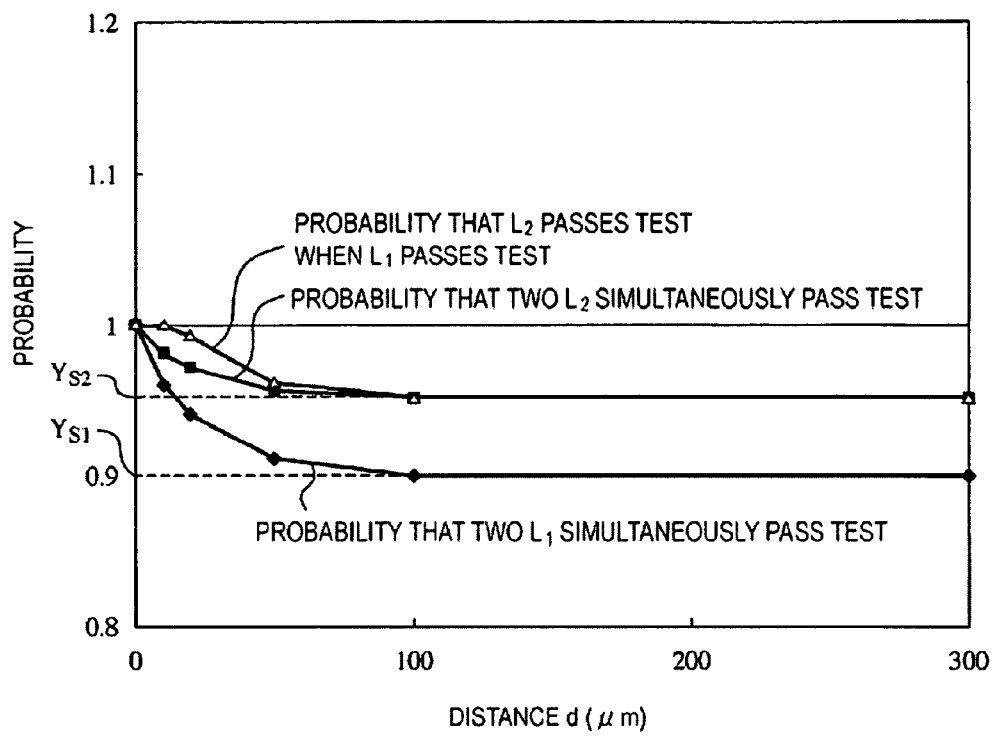
FIGS. 4A and 4B are a graph and a table of values showing a pass probability in a test of other sample patterns when a given sample pattern has passed the test.

FIG. 4A is a graph showing the test pass probability for another sample pattern when the given sample pattern has passed the test. In FIG. 4A, the distance d between the sample pattern and another sample pattern is plotted on the horizontal axis. In FIG. 4A the test pass probability of another sample pattern when the given sample pattern has passed the test is plotted on the vertical axis. In FIG. 4A, the ♦ mark indicates the test pass probability for another sample pattern L1 when a given sample pattern L1 has passed the test, this being the probability of two sample patterns L1 with same focus margin passing the test simultaneously. In FIG. 4A, the ■ mark indicates the test pass probability for another sample pattern L2 when a given sample pattern L2 has passed the test, this being the probability of two sample patterns L2 with same focus margin passing the test simultaneously. In FIG. 4A, the Δ mark indicates the test pass probability for another sample pattern L2 when a given sample pattern L1 has passed the test. FIG. 4B is a table of values showing the test pass probability for another sample pattern when the given sample pattern has passed the test.

When a given sample pattern L1 passes the test, the probability P1-1 ($d$) of another sample pattern L1 provided in the same position as the given sample pattern L1 passing the test is 1. On the other hand, when a given sample pattern L1 passes the test, the probability P1-1 ($d$) of another sample pattern L1 provided an infinitely large distance d away from the given sample pattern L1 passing the test approximately matches YS1, that is a systematic yield of sample pattern L1 resulting from defocus. Therefore, when a given sample pattern L1 passes the test, the probability P1-1 ($d$) of another sample pattern L1 provided exactly a distance d away from the given sample pattern L1 passing the test is a function that converges on 1 when the distance d is 0 and on YS1 when the distance d is infinitely large, as marked by ♦ in FIG. 4A.

In the same way, when a given sample pattern L2 passes the test, the probability P2-2 ($d$) of another sample pattern L2 provided exactly a distance d away from the given sample pattern L2 passing the test may be considered to vary depending on the distance d, in the same way as the probability P1-1 ($d$). Thus, when a given sample pattern L2 passes the test, the probability P2-2 ($d$) of another sample pattern L2 provided in the same position as the given sample pattern L2 passing the test is 1. On the other hand, when a given sample pattern L2 passes the test, the probability P2-2 ($d$) of another sample pattern L2 provided an infinitely large distance d away from the sample pattern L2 passing the test approximately matches the sample pattern L2 systematic yield YS2 resulting from defocus. Therefore, when a given sample pattern L2 passes the test, the probability P2-2 ($d$) of another sample pattern L2, provided exactly a distance d away from the given sample pattern L2, passing the test is a function that converges on 1 when the distance d is 0 and on YS1 when the distance d is infinitely large, as marked by ■ in FIG. 4A.

When a given sample pattern L2 passes the test, the probability P2-2($d$) of another sample pattern L2, provided exactly a distance d away from the given sample pattern L2, passing the test can be expressed as follows using the probability P1-1 ($d$).

[Formula 11]

$$P_{2-2}(d) = \frac{1 - Y_{s2}}{1 - Y_{s1}}(P_{1-1}(d) - Y_{s1}) + Y_{s2} \qquad (18)$$

Since the test is passed more easily by sample pattern L2 than by sample pattern L1, when probability P1-1 ($d$) is 1, probability P2-2 ($d$) is also 1. When the distance d is infinitely large, the probability P1-1 ($d$) is YS1 and the probability P2-2 ($d$) is YS2. Equation 16 is obtained based on this way of thinking.

Thus, when a given sample pattern L2 passes the test, the probability P2-2 ($d$) of another sample pattern L2 provided an infinitely large distance d away from the sample pattern L2 passing the test can be found using P1-1($d$) without actually forming a sample pattern group on the semiconductor substrate.

The probabilities for the other sample patterns Ln can also be found in the manner described above.

Moreover, it is possible to find the probabilities for a combination of two sample patterns with differing forms in the manner described below.

For instance, when a given sample pattern L1 passes the test, the test pass rate P1-2 ($d$) of another sample pattern L2 provided exactly a distance d away from the sample pattern L1 can be found as follows.

As described above, the sample pattern L1 is the sample pattern with the lowest yield. Hence, the test is passed more easily by sample pattern L2 than by sample pattern L1. This means that when a given sample pattern L1 passes the test, it can be considered certain that another sample pattern L2 provided in the same position as the given sample pattern L1 will pass the test. When a given sample pattern L1 passes the test, the probability that another sample pattern L2 provided in the same position as the sample pattern L1 passes the test can be assumed to be YS2/YS1. On the other hand, when a given sample pattern L1 passes the test, the probability P1-2 ($d$) that another sample pattern L2 provided an infinitely large distance d away from the sample pattern L1 passes the test approximately matches the sample pattern L2 systematic yield YS2 resulting from defocus.

Hence, when a given sample pattern L1 passes the test, the probability P1-2 ($d$) that another sample pattern L2 provided exactly a distance d away from the given sample pattern L1 passes the test can be expressed as follows using the probability P1-1 (d).

[Formula 12]

$$P_{1-2}(d) = \frac{1 - Y_{s2}}{1 - Y_{s1}}(P_{1-1}(d) - Y_{s1}) + Y_{s2} \qquad (19)$$

The graph of the above expression exceeds 1 when the distance d is comparatively short, as shown by the dotted line in FIG. 4A. Since a probability of greater than 1 is impossible, when the above expression yields a value which exceeds 1 the probability P1-2 (d) is set to 1.

Thus, when a given sample pattern L1 passes the test, the probability P1-2 (d) of another sample pattern L2 provided exactly a distance d away from the sample pattern L1 becomes the values marked by Δ in FIG. 4A.

In this way, the probability P1-1 (d), the probability P2-2 (d), and the probability P1-2 (d) are defined using functions or tables of values.

The above describes examples of the probability of another sample pattern L1 passing the test when one sample pattern L1 has passed the test, the probability of another sample pattern L2 passing the test when one sample pattern L2 has passed the test, and the probability of a sample pattern L2 passing the test when a sample patter L1 has passed the test. However, probabilities that 2 sample patterns will simultaneously pass the test are found for various other sample pattern combinations and the resultant probabilities are defined for each combination using a function or a table of values.

Techniques of the type described above are effective even when the area of the test chip is small and it is difficult to form many types of sample pattern L1 to Ln thereon.

In this way, when a given sample pattern passes the test, the probability of another sample pattern provided exactly a distance d away from the given sample pattern is found for a various sample patterns. In other words, probabilities that a sample pattern having a second yield and located exactly a distance d from a test-passing sample pattern having a first yield is found for a various sample patterns. The probabilities found in this way are then defined by a table of values or function with the distance d as a parameter.

The following describes a method for finding the systematic yield for the designed layout (device pattern), with reference to FIG. 5. FIG. 5 is a flowchart showing a method for calculating the systematic yield for the designed device pattern.

First, the pattern is laid out. In other words, the device pattern is designed in the device pattern region (step S1).

Next, as shown in FIG. 6, the device pattern region 12 is divided into a plurality of portion regions 14 (step S2). The size of each portion region when dividing the device pattern region 12 is, for instance, of the order of a few hundred μm. This is because when exposing a device pattern on the photoresist film formed on the substrate, the areas where defocus is marked occur periodically with an interval of a few hundred μm.

Figure 7A:
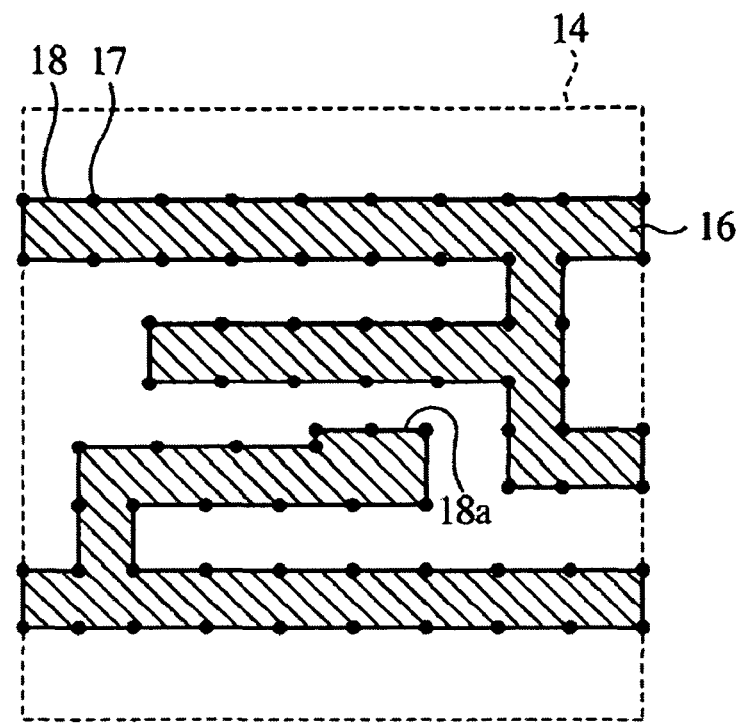
FIGS. 7A and 7B are plan views showing a device pattern with each side divided into segments.
Figure 7B:
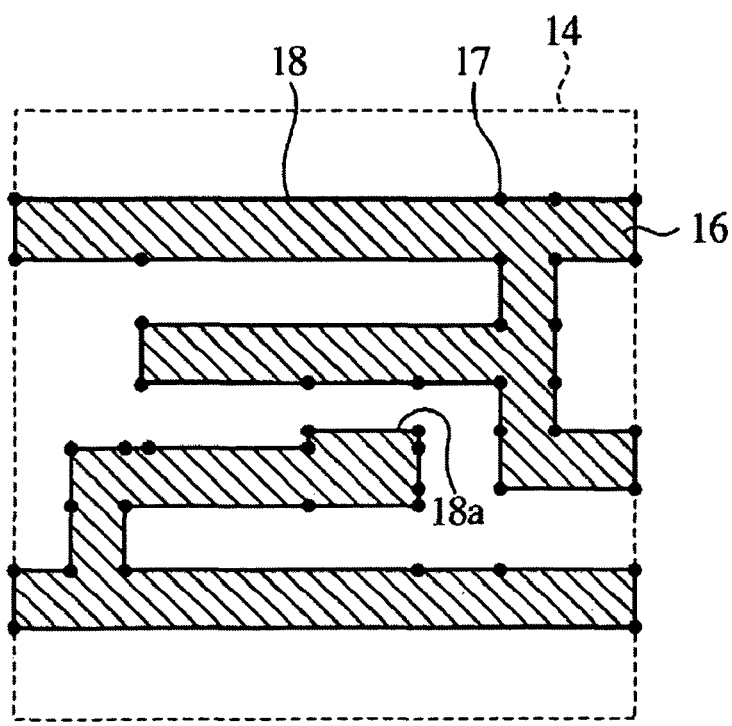

Next, as shown in FIG. 7, the various parts of the designed device pattern 16 are divided into a plurality of segments (parts marked by a solid line) (Step S3). FIG. 7 is a plan view showing the various pieces of the device pattern divided into segments. In FIG. 7, each of the points represents a point dividing pattern into segments (border) 17. This process is a called segmentation. Segmentation is performed for each of the divided portion regions 14 (see FIG. 6). When performing segmentation, each part of the device pattern 16 may be divided into, for instance, similarly sized segments 18. FIG. 7A is a plan view showing an example in which the various parts of the device pattern have been divided into similarly-sized segments. As described below, in a latter step, a focus margin is found for each segment 18. It is therefore necessary that each segment 18 is of a size that is appropriate for finding the focus margin. Hence, the size of each segment 18 is preferably of the order of a few tens of nm.

Although in the above-described example each part of the device pattern 16 is divided into similarly-sized segments, this need not be the case. For instance, the device pattern 16 may be divided at points where there are changes in neighboring patterns. 7B is a plan view showing an example in which segments have been formed by dividing at points which correspond to changes in neighboring areas of the device pattern.

Next, a focus margin is found for each segment 18 using a simulation (step S4). The focus margin of each segment can, for instance, be found as follows.

Figure 8A:
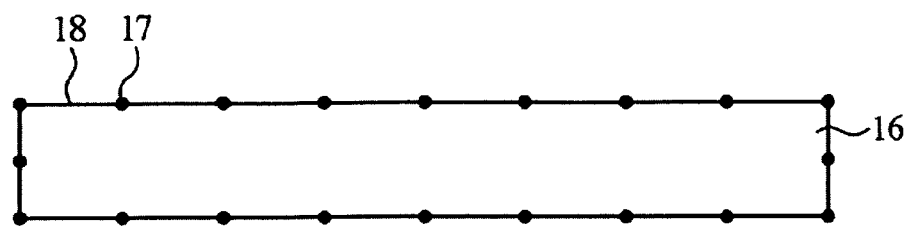
FIGS. 8A to 8C are plan views of a focus margin f segments calculated at various stages of a simulation.

FIG. 8 is a plan view showing stages of the simulation for finding the focus margin for a segment. FIG. 8A is a plan view showing a part of the designed device pattern.

Figure 8B:
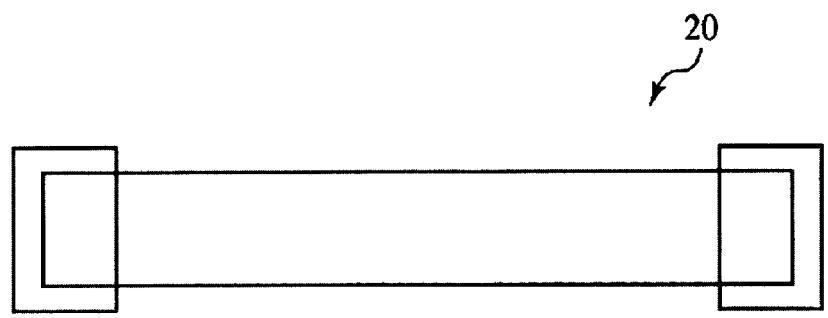
Figure 9:
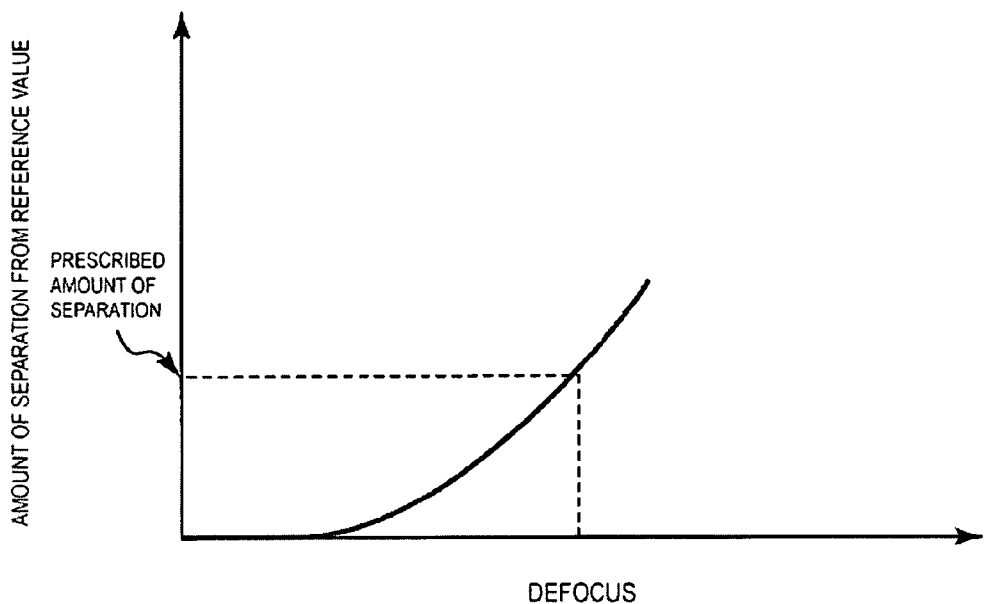
FIG. 9 is a graph showing the relationship between amount of separation from resist pattern dimension reference values and an amount of defocus.

First, OPC (Optical Proximity Correction), etching compensation or the like is performed on the designed device pattern 16 to produce mask data 20 (see FIG. 8B). FIG. 8B is a plan view showing mask data.

Figure 8C:

Next, changes in dimensions of the resist pattern 22 when the focus value undergoes various changes are found using the simulation. FIG. 8C is a plan view showing changes in dimension of the resist pattern as the focus values are changed. The solid line shows the resist pattern at best focus. The dashed line shows the resist pattern when the focus value is misaligned by 50 nm. The point-broken line shows the resist pattern when the focus value is misaligned by 100 nm.

Next, with the resist pattern 22 dimension at best focus as reference values, the amount of separation between the resist pattern 22 dimension and the reference value is found for different focus values.

FIG. 9 is a graph showing the relationship between the amount of separation of the resist pattern dimensions from the reference values and defocus. In FIG. 9, defocus amount is plotted along horizontal axis, and the amount of separation between the resist pattern dimension and the reference value is plotted on the vertical axis.

A graph of the type shown in FIG. 9 is found for each segment 18.

Next, an amount of defocus that causes a prescribed amount of separation between the resist pattern dimension and the reference value is found with reference to FIG. 9. The prescribed amount of separation is set to an amount of separation used when focus margins in the graph or table in FIG. 3 are obtained. For instance, when a separation of 5 nm is set as the reference for finding the focus margin of the sample pattern, the defocus which causes 5 nm of separation is found. The defocus amount found in this way is then the focus margin for that segment. In this way the focus margin for each segment is found.

Next, the yield for each segment 18 is found using a table of values or function relating the focus margin and the yield (step S5). The prepared table of values or function of the type shown in FIG. 3 is used as the table of values or function relating the focus margin and the yield.

Next, a lowest yield segment 18a (see FIG. 7), for which the yield is lowest, is specified for each portion region 14 (step 6). When a plurality of segments 18 with the lowest yield exist within a portion region 14, the segment among these that is closest to the center of the regional portion 14 is selected as the lowest yield segment 18a.

Next, distances d between the lowest yield segment 18a and other segments 18 are calculated (step S7). Distances d are between the lowest yield segment 18a and other segments 18 are calculated for each of the portion regions 14.

Next, when the lowest yield segment 18a has passed the test, the probabilities that the other segments 18 pass the test are calculated for each portion region 14 (step S8). When a pattern having a given yield has passed the test, the probability that a pattern having a different yield located a distance d away from the pattern having the given yield passes the test is defined in advance as a table or function (see FIG. 4). Thus, based on the table or function associating segments 18 and 18a, it is possible to calculate the probabilities Pi that the segments 18 other than the segment 18a pass the test when the lowest yield segment 18a passes the test.

Next, the yield of the device pattern 16 in the portion region 14 is found (step S9).

The probability that the lowest yield segment 18a in the portion region 14 passes the test and all the other segments 18 existing in the portion region 14 simultaneously pass the test is the yield of the device pattern 16 in the portion region 14. Hence, the yield of the device pattern 16 in the portion region 14 is found by finding a product of the lowest yield value of segment 18a and a total product of the probabilities associated with the segments 18 passing the test when the lowest yield segment 18a has passed the test, and then finding the product of the total product and the yield of the device pattern 16 in the portion region 14. The systematic yield Ysk caused by defocus of the device pattern 16 in the portion region k is expressed using the following formula.

[Formula 13]

$$Y_{sk} = y_w \prod_{i=1}^{n} P_i \qquad (20)$$

Here, yw is the yield of the lowest yield segment.

Next, the systematic yield Ys caused by defocus over the entire device pattern region 12 is found based on each systematic yield Ysk caused by defocus of the device pattern 16 in the portion region 14 (step S10). The systematic yield Ys caused by defocus over the entire device pattern region 12 is found by taking the product of the systematic yields Ysk caused by defocus of the device pattern 16 in the each of the portion regions 14. The systematic yield Ys caused by defocus over the entire device pattern region 12 is expressed using the following formula.

[Formula 14]

$$Y_s = \prod_{k=1}^{n} Y_{sk} \qquad (21)$$

In this way, the systematic yield caused by defocus of the device pattern region in the semiconductor device can be found.

Thus, according to the present embodiment, since the systematic yield resulting from various elements having a distance-dependence based on focus misalignment and the like is found while taking into consideration the distance between each of the portion patterns which make up the device pattern, it is possible to calculate the yield for the semiconductor device more accurately.

Figure 10:
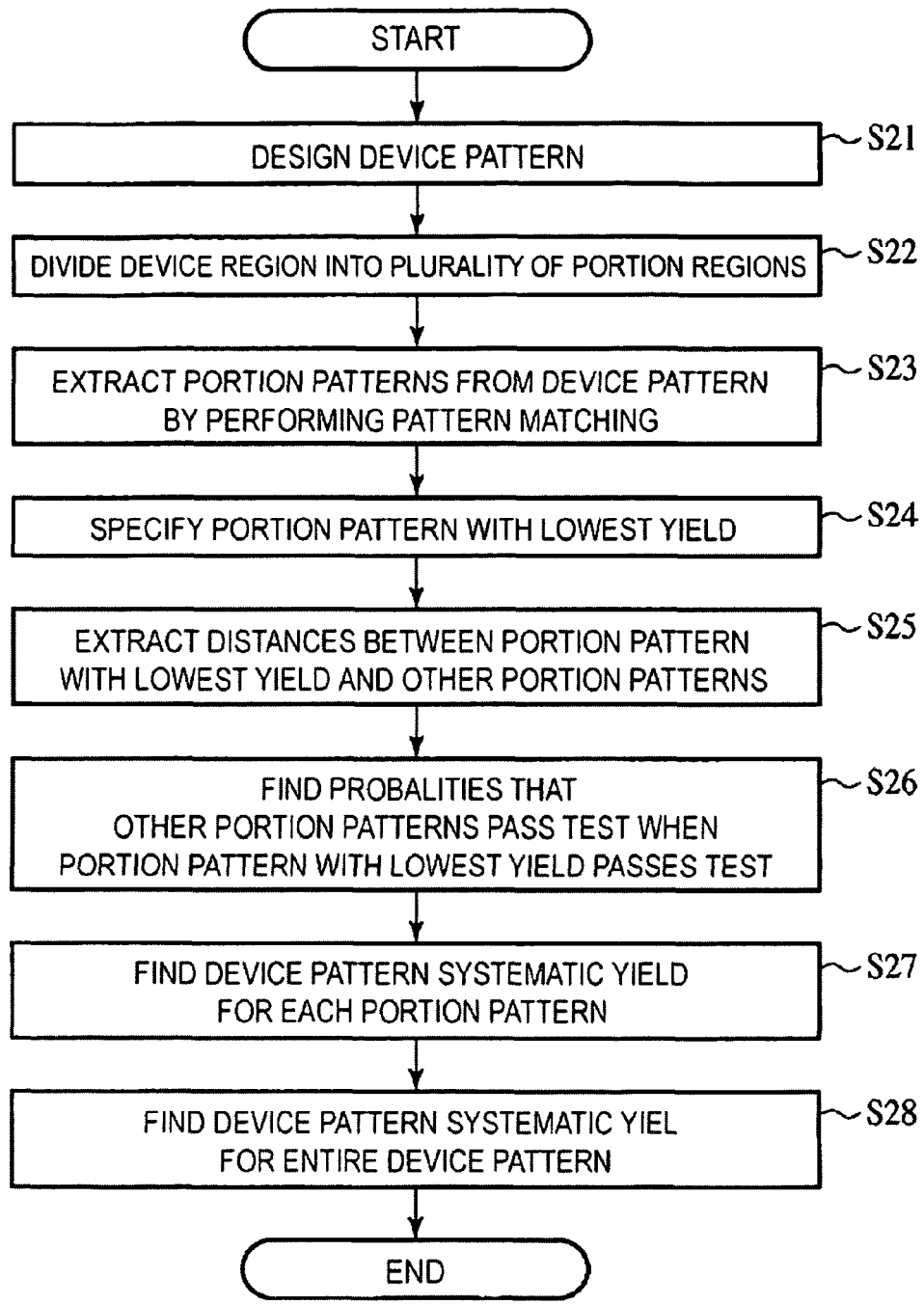
FIG. 10 is a flowchart showing a method for calculating device pattern yields for designed device patterns.

A yield calculation method for the semiconductor device according to the second embodiment and a computer program for causing a computer to execute the yield calculation method for the semiconductor device are described with reference to FIG. 10. FIG. 10 is a flowchart showing a method for calculating the yield for the designed device pattern. Elements of the construction, which are the same as those in the semiconductor device yield calculation method of the first embodiment shown in FIG. 1 to FIG. 9, are indicated with the same symbols. Moreover, the description of these elements has been omitted or simplified.

The semiconductor yield calculation method of the present embodiment can be executed using, for instance, a semiconductor design device (CAD) installed with a computer program for executing the semiconductor device yield calculation method of the present embodiment. The computer program can be provided using a storage medium such as a CD-ROM. Moreover, the computer program may be installed in advance on the semiconductor design device. By installing the computer program in advance on the semiconductor design device, it is possible to provide a yield calculating device capable of executing the yield calculating method of the present embodiment.

The semiconductor device yield calculating method of the present embodiment is mainly characterized by the operation of pattern matching to form correspondences between sample patterns and portion patterns which make up the device pattern.

The method of the second embodiment is the same as that of the first embodiment from the step in which the focus margin-dependent systematic yield is found for a number of sample patterns L1 to Ln which seem likely to cause a deterioration in yield to the step in which the probability that another sample pattern will pass a test when a given sample pattern passes the test is defined using a table of values or function with the distance d as the parameter. Therefore, an explanation of these steps has been omitted.

Next, the pattern is laid out as shown in FIG. 10. In other words, the device pattern is designed in the device pattern region (step S21).

First, the device pattern region 12, which is the region in which the device pattern is formed, is divided into a plurality of portion regions 14 (see FIG. 6) (step S22). The size of each portion region when dividing the device pattern region is, for instance, of the order of a few hundred μm, as in the first embodiment.

Next, by performing pattern matching, portion patterns equivalent to the sample patterns L1 to Ln or portion patterns resembling the sample patterns L1 to Ln are extracted (step S23).

Next, the lowest yield portion pattern among the group of extracted portion patterns is specified for each portion region based on yield values quantified using the test chip (step S24). When a plurality of portion patterns with the lowest yield are present in the portion region, for instance, the portion pattern with the lowest yield that is closest to the center of the portion region may be selected as the lowest yield portion region.

Next, the distance between the lowest yield portion pattern and portion patterns other than the lowest yield portion pattern are each calculated (step S25). The distance between the lowest yield portion pattern and portion patterns other that the lowest yield portion pattern are calculated in each portion region.

Next, the probabilities that portion patterns other than the lowest yield portion pattern pass the test when the lowest yield portion pattern passes the test are found (step S26). The probabilities that portion patterns other than the lowest yield portion pattern pass the test when the lowest yield portion pattern passes the test are found for each portion region. The probability that another sample pattern located exactly a distance d from a given sample pattern passes the test when the given sample pattern passed the test is predefined, as described above, using a table of values or function with the distance d between the given sample pattern and the other sample pattern as a parameter (see FIG. 4). Hence, the probabilities Pi that portion patterns other than the lowest yield portion pattern pass the test when the lowest yield portion pattern passes the test are each found based on the prepared table of values or function.

Next, the systematic yield of the device pattern in each portion region 14 is found (step S27). The probability that the lowest portion pattern in the portion region 14 passes the test and all the other portion patterns present in the portion region 14 simultaneously pass the test is the yield of the device pattern in the portion region 14. Hence, the yield of the device pattern in the portion region 14 can be found by finding a total product of the probabilities associated with the portion patterns other than the lowest yield portion pattern passing the test when the lowest yield portion pattern passes the test, and then finding the product of the total product and the yield of the portion pattern with the lowest yield. The systematic yield Ysk of the device pattern in the portion region k is expressed using the following formula.

[Formula 15]

$$Y_{sk} = y_w \prod_{i=1}^{n} P_i \qquad (22)$$

Here, yw is the yield of the lowest yield portion pattern.

Next, the systematic yield over the entire device pattern region 12 is found based on the systematic yield found for the device pattern in each portion region 14 (step S28). The systematic yield of the entire device pattern region 12 is found by taking the product of the systematic yields found for the device pattern in the portion regions 14 (step S27). The systematic yield Ys over the entire device pattern region 12 is expressed using the following formula.

[Formula 16]

$$Y_s = \prod_{k=1}^{n} Y_{sk} \qquad (23)$$

In this way, the systematic yield of the device pattern is found.

Thus, the device pattern systematic yield may be found by pattern matching to form correspondences between sample patterns and portion patterns which make up the device pattern.

A yield calculation method for the semiconductor device according to the third embodiment and a computer program for causing a computer to execute the yield calculation method for the semiconductor device are described with reference to FIG. 11 to FIG. 14. FIG. 11 shows a relationship between a depth of depression on the surface of an element isolation region and the systematic yield of a design cell. FIG. 12 and FIG. 13 are plan views showing examples of sample pattern groups arranged in an array on the semiconductor substrate. FIG. 14 is a flowchart showing a method for calculating the yield for the designed device pattern. Elements of the construction which are the same as those in the semiconductor device yield calculation method of the first or second embodiment shown in FIGS. 1 to 10 are indicated with the same symbols. Moreover the description of these elements has been omitted or simplified.

The semiconductor yield calculation method of the present embodiment can be executed using, for instance, a semiconductor design device (CAD) installed with a computer program for executing the semiconductor device yield calculation method of the present embodiment. The computer program can be provided using a storage medium such as a CD-ROM. Moreover, the computer program may be installed in advance on the semiconductor design device. By installing the computer program in advance on the semiconductor design device, it is possible to provide a yield calculating device capable of executing the yield calculating method of the present embodiment.

The semiconductor device yield calculating method of the present embodiment is mainly characterized by the depth of depression occurring in the substrate surface of the device pattern when flattening by CMP (Chemical Mechanical Polishing) being taken into account when finding the systematic yield of the device pattern.

Note that while here an example in which the systematic yield is calculated so as to take into account the depth of depressions occurring when the element isolation regions are formed using an STI method, the occurrence of depressions in the surface of the substrate is not limited to when the element isolation regions are formed using the STI method. The principles of the present invention can be widely applied when finding the systematic yield in a way that takes into account the occurrence of depressions in the surface of the substrate.

In the present embodiment, an example in which the semiconductor device is designed by first designing small circuit units known as cells and then combining the designed cells by disposing and wiring the cells on the substrate is described.

Note, in the present embodiment, an example in which the semiconductor device is designed by designing small circuit units known as cells and then combining the designed cells by arranging the cells and wiring on the substrate is described. However, the principles of the present invention can further be applied when blocks are designed and the blocks are arranged and wired on the substrate.

First, as shown in FIG. 14, the design cells to be used in the design of the device pattern are laid out (step 31).

Next, a systematic yield value for each design cell is found (step S32). The systematic yield value of each design cell differs according to the depth of depressions on the surface of the element isolation region. The systematic yield value of the design cell differs according to the depth of the depressions in the surface of the element isolation region because, as the depth of the depression in the surface of the element isolation region increases, defocus increases, causing the focus margin to change.

In order to find the design cell yield, it is necessary to quantify the depth of the depression. However, at the design cell stage the depth of the depression cannot be quantified. The unevenness generated by CMP methods depends not just on the form of the patterns present in the design cells, but also on the pattern density in regions is of the order of from a few tens of μm to a few hundreds of μm. On the other hand, the design cells size is of the order of a few μm to 20 μm. Thus, the size of the design cells or the like is extremely small in comparison to the range of the effects resulting from CMP. Therefore, the final yield value cannot be calculated until the arrangement and wiring has been completed and a surrounding environment has been decided. Hence, the systematic yield value at the design cell stage is defined using a table of values or function with the depth of depressions on the surface of the element isolation region as a parameter as shown in FIG. 11.

Figures 11A, 11B:
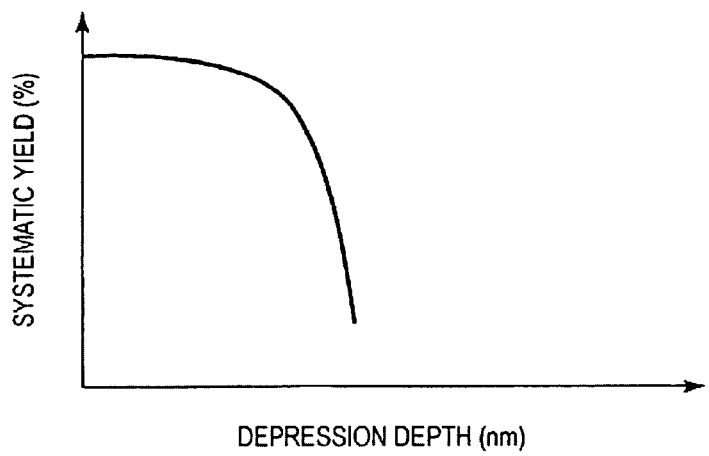
FIGS. 11A and 11B show a relationship between a depth of depression on the surface of element isolation regions and the systematic yield of the design cell.

FIG. 11 shows a relationship between a depth of depression on the surface of an element isolation region and the systematic yield of a design cell. FIG. 11A is a graph showing the relationship between the depth of depression on the surface of the element isolation and the systematic yield of the design cell, and FIG. 11B is a table of values showing a relationship between the depth of depression in the surface of the element isolation region and the systematic yield of the design cell. The table of values or function can, for instance, be found using a technique which differs only slightly from the yield calculating method of the first embodiment. In the first embodiment a focus margin is found for each of the segments which make up the device pattern, and the yield is calculated based on the resulting focus margins. However, when depressions are present on the surface of the substrate, the focus margins are reduced by an amount corresponding to the depth of the depressions. Hence, to calculate design cell yield so as to take into account the depth of depressions on the substrate, the yield is calculated while taking into account the reduction in focus margin resulting from the depth of depression. For instance, when a local depression depth dependent on the pattern in a cell is predicted to be $\delta(x,y)$ by a CMP simulator or the like and a global depression depth dependent on the environment surrounding the cell is g, the focus margin when no depressions are present is reduced by $\delta(x,y)+g$. For instance, the systematic yield when the depression depth is varied in the 0 nm to 50 nm range is obtained, a table or function of the type shown in FIG. 11 is found. A table or function of the type shown in FIG. 11 is found for each design cell.

It is also possible to find the relationship between the depth of depression in the surface of the element isolation region and the design cell systematic yield by measuring the yield of the sample pattern group (test pattern group) formed by arranging sample patterns (test patterns) in an array. Note that patterns in the design cell layout for which there is a possibility that yield will drop due to the presence of depressions in the surface of the element isolation region are used as the sample patterns which make up the sample pattern group.

FIGS. 12 and 13 are plan views showing examples of sample pattern groups arranged in an array on the semiconductor substrate.

Figure 12A:
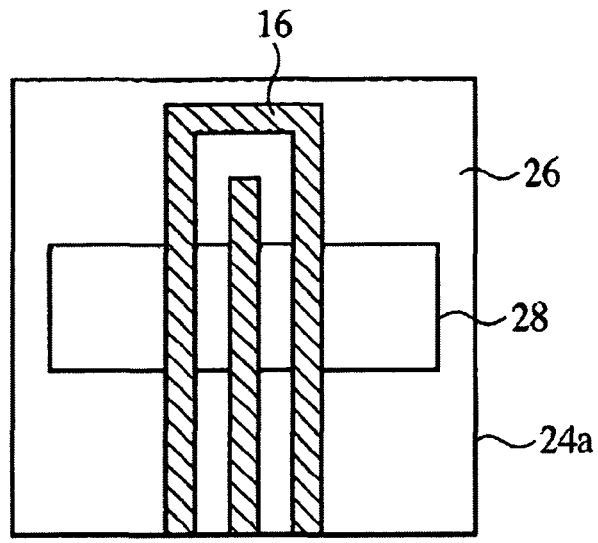
FIGS. 12A and 12B are (first) plan views showing an example of a sample pattern group arranged in an array on a semiconductor substrate.
Figure 12B:
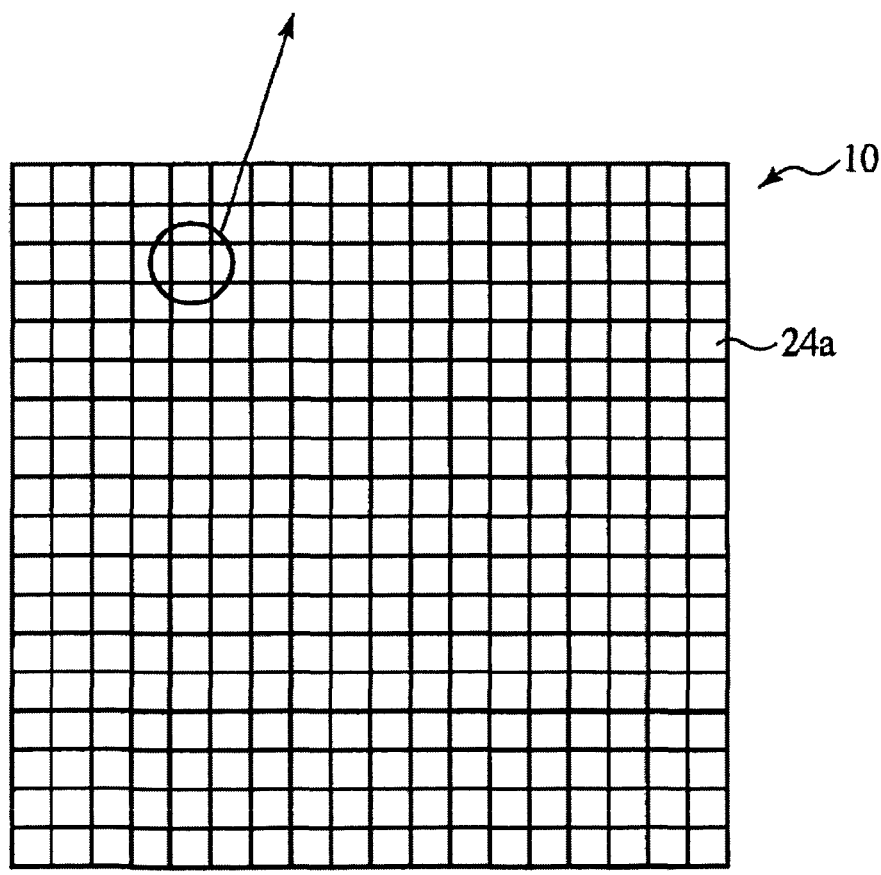
Figure 13A:
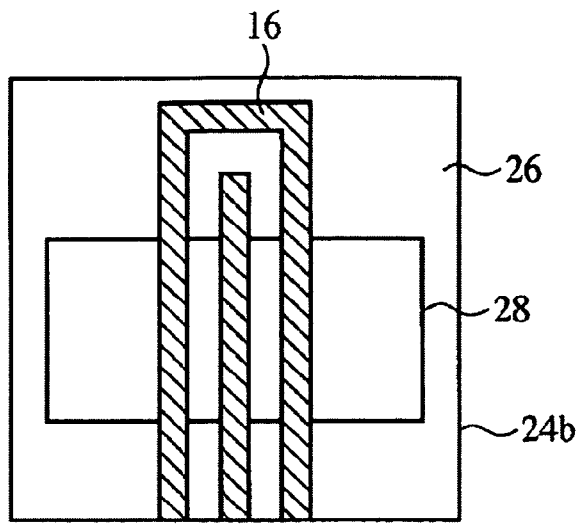
FIGS. 13A and 13B are (second) plan views showing an example of a sample pattern group arranged in an array on a semiconductor substrate.

FIG. 12B is a (first) plan view showing NO sample patterns arranged in an array on the semiconductor substrate 10. FIG. 12A is an enlarged view of the encircled portion in FIG. 12B. As shown in FIG. 12B, NO sample patterns 24a are arranged in an array on the semiconductor substrate 10. As shown in FIG. 12A, the boundaries of the element regions 28 are defined by the element isolation regions 26. The area ratio of the element isolation region 26 in each sample pattern 24a is A %. Since the area ratio of the element isolation region 26 is comparatively large, comparatively deep depressions (not shown in the drawings) are formed in the surface of the element isolation region 26. For example, a depression with a maximum depth 40 nm may be formed in the surface of the element isolation region 26.

Figure 13B:
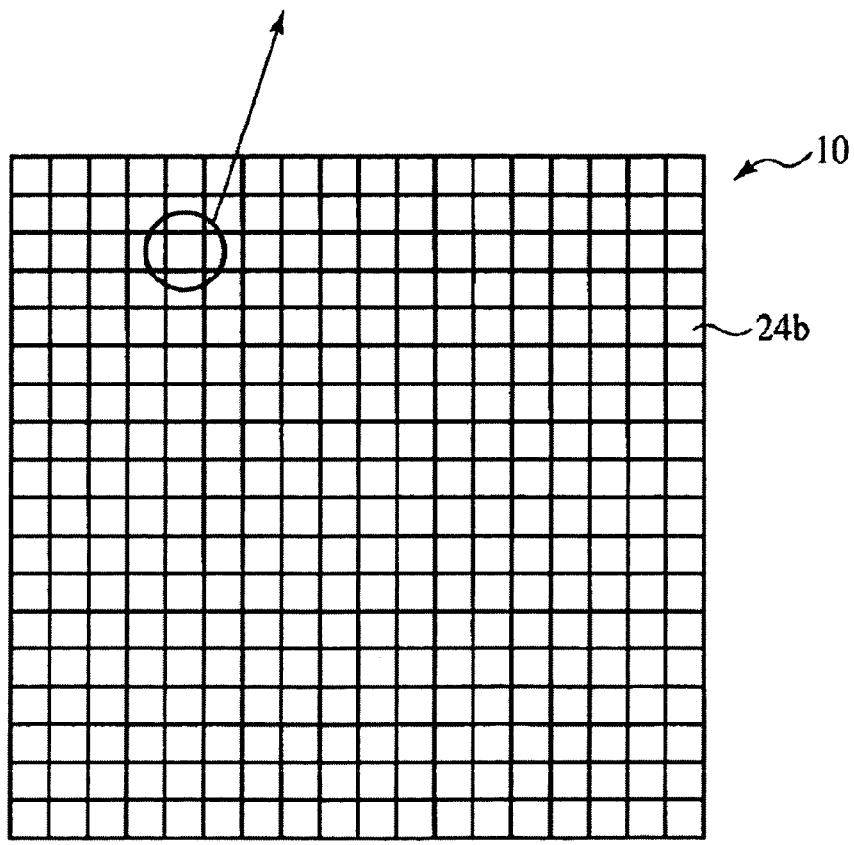
Figure 14:
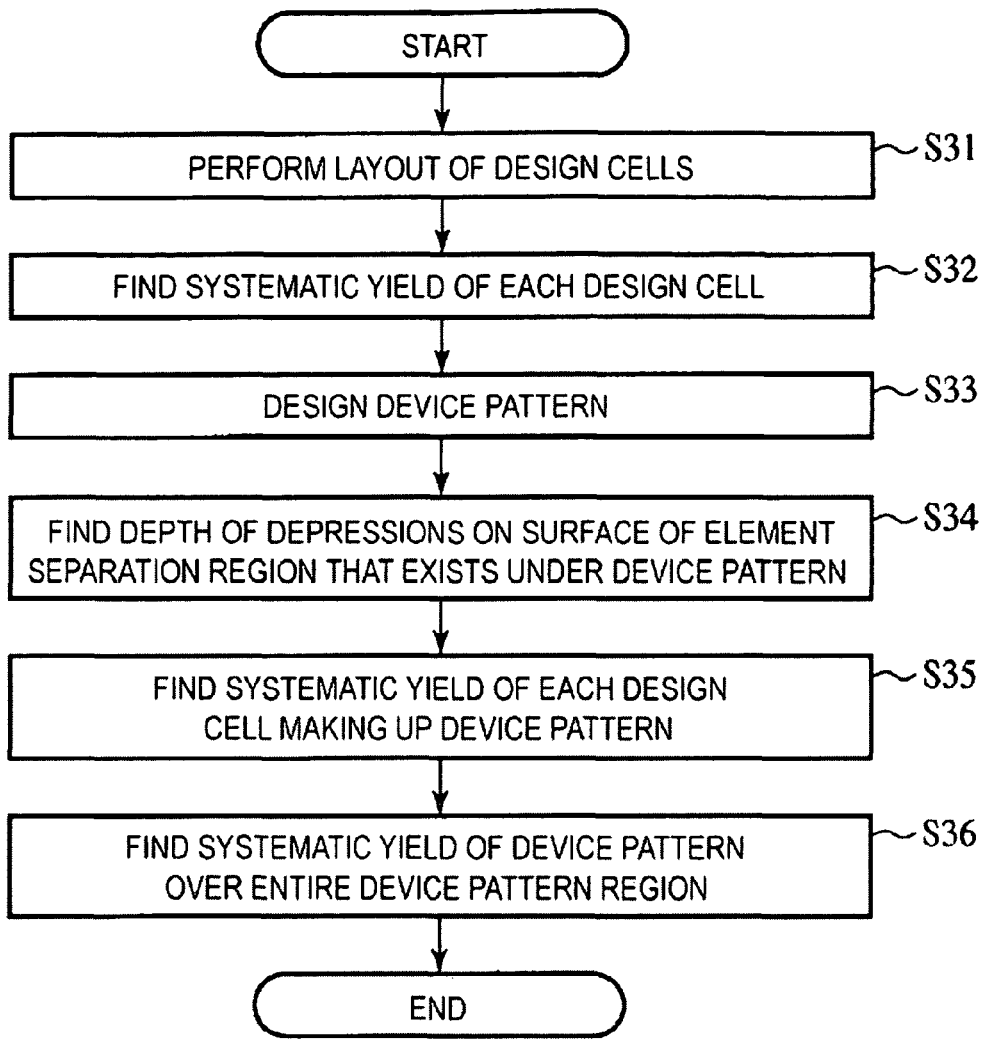
FIG. 14 is a flowchart showing a method for calculating device pattern yields for designed device patterns.

FIG. 13B is a (second) plan view showing NO sample patterns arranged in an array on the semiconductor substrate 10. FIG. 13A is an enlarged view of the encircled portion in FIG. 13B.

As shown in FIG. 13B, NO sample patterns 24b are arranged in an array on the semiconductor substrate 10. As shown in FIG. 13A, the boundaries of the element regions 28 are defined by the element isolation regions 26. The area ratio of the element isolation region 26 in each sample pattern 24b is B %. Since the area ratio of the element isolation region 26 is comparatively small, comparatively shallow depressions (not shown in the drawings) are formed in the surface of the element isolation region 26. For example, depressions with a depth of 20 nm may be formed in the surface of the element isolation region 26.

In the same way, various sample pattern groups with differing area ratios for the element isolation region 26 are formed on semiconductor substrates 10.

The systematic yield for each design cell, which is dependent on the depth of depression in the surface of the element isolation region 26, is then found based on the yields obtained for the various sample pattern groups.

Next, the device pattern is designed using the various design cells (step S33) as shown in FIG. 14.

Next, the depth of the depressions found in the surface of the element isolation region 26 present in the device pattern is found (step S34). The depth of the depressions in the surface of the element isolation region can be found based on methods such as CMP simulation or taking area ratios of the element isolation region 26 in a prescribed region.

Next, systematic yield values for each of the design cells making up the device pattern are found using the table of values or function showing a relationship between the depth of depression in the surface of the element isolation region and the systematic yield of the design cell (step S35). A prepared table of values and or function of the type shown in FIG. 11 is used as the table of values or function showing a relationship between the depth of depression in the surface of the element isolation region and the systematic yield of the design cell. This allows the systematic yield Ysk of each design cell making up the device pattern to be found.

Next, the device pattern systematic yield Ys over the entire device pattern region 12 is found based on the systematic yields Yks found for each design cell making up the device pattern (step S36). The systematic yield Ys of the entire device pattern region 12 is found by taking the product of the systematic yields Ysk found for each design cell. The device pattern systematic yield Ys over the entire device pattern region 12 is expressed using the following formula.

[Formula 17]

$$Y_s = \prod_{k=1}^{n} Y_{sk} \quad (24)$$

This allows a semiconductor device systematic yield that takes into account the unevenness generated on the substrate to be found.

Thus, in the present embodiment, since a systematic yield that takes into account the unevenness generated on the substrate is found, semiconductor device yield can be found more accurately.

[Modifications]

The present invention is not limited to the above described embodiments and various modifications are possible.

For instance, the first embodiment describes an example in which the segment with the lowest yield is specified and the probability that all the other segments will pass the test when the segment with the lowest yield passes the test is found. However, the specified segment is not limited to being the segment with the lowest yield. Any one of the plurality of segments may be specified and the probability that all the other segments pass the test when the specified segment passes the test may be found.

The second embodiment describes an example in which the portion pattern with the lowest yield is specified and the probability that all the other portion patterns will pass the test when the portion pattern with the lowest yield passes the test is found. However, the specified portion pattern is not limited to being the portion pattern with the lowest yield. Any one of the plurality of portion patterns may be specified and the probability that all the other portion patterns pass the test when the specified portion pattern passes the test may be found.

The first and second embodiments describe an example in which the yield is reduced by the defocus which occurs in photolithography, but the principles of the present invention can be applied in the same way when the yield is reduced due to an exposure margin or due to MEEF (Mask Error Enhancement Factor) in photolithography. Moreover, it is possible to apply the principles of the present invention when a deterioration in yield is caused by factors unrelated to photolithography.

The third embodiment describes an example in which the systematic yield is calculated so as to take into account the depth of depressions occurring in the surface of the element isolation region when the element isolation regions are formed using the STI method. However, the principles of the present invention can be widely applied when systematic yield is calculated in a way that takes into account the occurrence of unevenness on the substrate. For instance, when embedding a contact plug in an interlayer insulating film using a CMP, unevenness occurs in the interlayer insulating film. However, the principles of the present invention can be applied to calculate the systematic yield in a way that takes this unevenness into account.

What is claimed is:

1. A semiconductor device yield calculation method executed by a computer comprising:
   selecting from a device pattern, which has already been designed, to specify a first pattern, and a second pattern that differs from the first pattern;
   finding a probability that the second pattern passes a test when the first pattern passes the test for each of a plurality of distances between the first pattern and the second pattern, using a function or a table of values that has been calculated in advance; and
   finding a yield of the device pattern based on a product of the probability and a yield value for the first pattern.

2. The semiconductor device yield calculation method of claim 1, wherein
   when a plurality of second patterns are presented, a yield of the device pattern is calculated based on a product of a) a product of probabilities associated with each of the second patterns and b) a yield value for the first pattern.

3. The semiconductor device yield calculation method of claim 1, further comprising:
   a step of dividing, before the selecting step, a device pattern region where the device pattern is formed into a plurality of portion regions, wherein
   in the selecting step, the first pattern, is specified for each portion region,
   in the finding a probability step, the probability that the second pattern passes the test when the first pattern passes the test is found for each portion region and,
   in the finding a yield step, a yield of the device pattern presented in each portion region is calculated, and a yield of the device pattern over the entire device pattern region is found based on a product of values calculated for a yield of the device pattern presented in each portion region.

4. The semiconductor device yield calculation method of claim 1, wherein
   in the selecting step, a single pattern with the lowest yield among a plurality of patterns included in the device pattern is specified as the first pattern.

5. The semiconductor device yield calculation method of claim 1, wherein
   the table of values or the function is found using a test chip.

6. The semiconductor device yield calculation method of claim 5, wherein
   the test chip includes sample patterns arranged in an array to form a sample pattern group.

7. The semiconductor device yield calculation method of claim 6, wherein
   the sample pattern group is an array of identically shaped sample patterns.

8. The semiconductor device yield calculation method of claim 6, wherein
   the sample pattern group is an array of variously shaped sample patterns randomly positioned therein.

9. The semiconductor device yield calculation method of claim 5, further comprising:
   before the selecting step, extracting from the device pattern, by pattern matching a sample pattern included in the test chip with the device pattern, a pattern identical to or closely resembling the sample pattern.

10. The semiconductor device yield calculation method of claim 1, wherein
    in a plurality of the functions, one function is found using a test chip, and
    the other functions are found based on the one function found using the test chip.

11. A semiconductor device yield calculation method executed by a computer comprising:
    designing a device pattern using a plurality of design cells having an identical pattern and a plurality of design blocks having an identical pattern;
    finding a depth of a depression part presented on a surface of a substrate of the device pattern;
    finding a yield value corresponding to the depth of the depression part for each of the design cells or each of the design blocks making up the device pattern, using a prepared table of values or a function; and
    finding a yield of the device pattern based on a product of the yield values for the design cells or the design blocks which make up the device pattern.

12. The semiconductor device yield calculation method of claim 11, wherein
    the prepared table of values or the function is found using a test chip with the depth of the depression as a parameter.

13. The semiconductor device yield calculation method of claim 11, wherein
the depression part has been caused by flattening using a chemical mechanical polishing method.

14. The semiconductor device yield calculation method of claim 11, wherein
in the finding a depth step, the depth of the depression part is found based on an element isolation region area ratio in said each of the design cells or said each of the design blocks.

15. A computer readable medium encoded with a computer readable program for causing a computer to execute:
selecting from a device pattern, which has already been designed, to specify a first pattern and a second pattern that differs from the first pattern;
finding a probability that the second pattern passes a test when the first pattern passes the test for each of a plurality of distances between the first pattern and the second pattern, using a function or a table of values that has been calculated in advance; and
finding a yield of the given pattern, with a given distance between the first pattern and the second pattern, based on a product of the probability that the second pattern passes the test when the first pattern passes the test and a yield value for the first pattern.

16. The computer readable medium encoded with a computer readable program of claim 15, wherein
the table of values or the function is found using a test chip.

17. The computer readable medium encoded with a computer readable program of claim 16, wherein
the test chip includes sample patterns arranged in an array to form a sample pattern group.

18. The computer readable medium encoded with a computer readable program of claim 16, further causing the computer to execute
before the selecting step, extracting from the device pattern, by pattern matching a sample pattern included in the test chip with the device pattern, a pattern identical to or closely resembling the sample pattern.

* * * * *